United States Patent

Torrey

(10) Patent No.: US 9,634,585 B2
(45) Date of Patent: Apr. 25, 2017

(54) CONTROL METHOD FOR REDUCING TORQUE RIPPLE IN AN ELECTRICAL MACHINE

(71) Applicant: GENERAL ELECTRIC COMPANY, Schenectady, NY (US)

(72) Inventor: David Allan Torrey, Ballston Spa, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/970,670

(22) Filed: Dec. 16, 2015

(65) Prior Publication Data

US 2016/0105135 A1    Apr. 14, 2016

Related U.S. Application Data

(63) Continuation-in-part of application No. 14/299,116, filed on Jun. 9, 2014, now Pat. No. 9,246,429.

(60) Provisional application No. 61/942,199, filed on Feb. 20, 2014.

(51) Int. Cl.
  *H02P 6/10* (2006.01)
  *H02P 25/098* (2016.01)
  *H02P 25/092* (2016.01)

(52) U.S. Cl.
  CPC ............ *H02P 6/10* (2013.01); *H02P 25/092* (2016.02); *H02P 25/098* (2016.02)

(58) Field of Classification Search
  CPC .......................................................... H02P 6/10
  USPC .................................... 318/254.1, 432, 443
  See application file for complete search history.

(56) References Cited

U.S. PATENT DOCUMENTS

| | | | |
|---|---|---|---|
| 5,844,343 A | 12/1998 | Horst | |
| 6,150,791 A | 11/2000 | Fulton | |
| 6,788,021 B2 | 9/2004 | Sozer et al. | |
| 6,864,658 B1 | 3/2005 | Torrey et al. | |
| 7,161,314 B2 | 1/2007 | Nakai et al. | |
| 7,166,984 B1 * | 1/2007 | Jones | H02K 17/12 310/254.1 |
| 7,358,698 B2 * | 4/2008 | Seguchi | H02K 19/28 310/180 |
| 7,768,220 B2 | 8/2010 | Schultz et al. | |

(Continued)

FOREIGN PATENT DOCUMENTS

WO    2011030499 A1    3/2011

OTHER PUBLICATIONS

J. Moon et al., "Switched Reluctance Motor with 2-phase Excitation," Industry Applications Conference, IEEE, vol. 1, pp. 547-552, Oct. 12-15, 1998.

(Continued)

*Primary Examiner* — David S Luo
(74) *Attorney, Agent, or Firm* — Joseph J. Christian (57) ABSTRACT

A method of controlling torque ripple in an electrical machine that includes a field winding for creating nominally constant field current using DC current and an armature winding for creating a rotating magnetic field using AC current, calls for superimposing a spatially varying current component on to the DC current of the field winding. Other methods are also disclosed that are suitable for electrical machines that have a winding that is excited with nominal DC current including SRMs, FSMs, and wound-field synchronous motors.

22 Claims, 6 Drawing Sheets

(56) References Cited

U.S. PATENT DOCUMENTS

| | | | |
|---|---|---|---|
| 7,880,424 B2 * | 2/2011 | Seguchi | H02K 21/042 |
| | | | 318/523 |
| 8,294,317 B2 | 10/2012 | Kamida | |
| 2009/0021192 A1 | 1/2009 | Kudligi | |
| 2010/0141061 A1 | 6/2010 | Ramu et al. | |
| 2012/0175997 A1 | 7/2012 | Lee et al. | |
| 2013/0221889 A1 | 8/2013 | Kim et al. | |

OTHER PUBLICATIONS

R. Rabinovici, "Torque Ripple, Vibrations, and Acoustic Noise in Switched Reluctance Motors," HAIT Journal of Science and Engineering B, vol. 2, Issues 5-6, pp. 776-786, Jul. 10, 2005.

Y. Sozer et al., "Advanced Control Techniques for Switched Reluctance Machine Drives in Emerging Applications," 2013 IEEE Energy Conversion Congress and Exposition, pp. 3776-3783, Sep. 15-19, 2013.

* cited by examiner

CONTROL METHOD FOR REDUCING TORQUE RIPPLE IN AN ELECTRICAL MACHINE

CROSS REFERENCE TO RELATED APPLICATIONS

This Continuation-In-Part (C.I.P.) application claims priority to the Jun. 9, 2014 filing date of U.S. application Ser. No. 14/299,116 (Entitled: CONTROL METHOD FOR REDUCING TORQUE RIPPLE IN SWITCHED RELUCTANCE MOTORS, which, in turn, claims priority under 35 U.S.C. §119(e)(1) of provisional application Ser. No. 61/942,199, filed Feb. 20, 2014 . Both references are incorporated herein in their entirety.

BACKGROUND

The subject matter of this disclosure relates generally to electrical machines, and more particularly, to a control method for reducing torque ripple in electrical machines.

A limiting factor in the application of electrical machines (e.g., switched reluctance motors (SRMs), flux switching motors (FSMs), or wound-field synchronous motors) is the torque ripple produced by interaction of the stator and rotor magnetic fields as the machine rotates. (While all electrical machines have this issue, aspects of this invention relate to those machines in which there is a winding that is excited with nominal DC current). In the past, it was possible to reduce torque ripple produced by the electrical machine only over a limited speed range and with the use of sophisticated current regulators applied to the armature currents.

Control of the electrical machine is complicated by the spatial and magnetic nonlinearities inherent to the machine. The traditional approach to electrical machine excitation is to design the current waveform for each phase, and implement those current waveforms independently of one another. This requires an inverter structure that is different from the inverter structure that is used for other types of AC machines, such as permanent magnet synchronous and induction machines.

In view of the foregoing, there is a need for a method of reducing torque ripple in electrical machines that facilitates the use of a standard inverter topology, combined with a simpler current regulation algorithm.

BRIEF DESCRIPTION

According to one embodiment, a method of controlling torque ripple in an electrical machine, the method comprises: splitting each phase winding of an electrical machine into an AC winding and a DC winding; exciting the AC winding of each phase winding with symmetrically displaced sinusoidal currents; and, exciting the DC winding of all phase windings with a varying DC current based on spatially varying magnetic properties of the electrical machine.

According to another embodiment, a method of controlling torque ripple in an electrical machine, wherein the electrical machine includes a field winding for creating nominally constant field current using DC current and an armature winding for creating a rotating magnetic field using AC current, the method comprises superimposing a spatially varying current component on to the DC current of the field winding, thereby reducing torque ripple in the electrical machine.

According to yet another embodiment, a method of controlling torque ripple in an electrical machine, the method comprises: splitting each phase winding of an electrical machine into an AC winding and a DC winding; exciting the DC winding of all phase windings with a varying DC current based on spatially varying magnetic properties of the electrical machine; and exciting the AC winding of each phase winding with symmetrically displaced sinusoidal currents that vary in response to a rotor position.

DRAWINGS

These and other features, aspects, and advantages of the present invention will become better understood when the following detailed description is read with reference to the accompanying drawings, wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Figure 1:
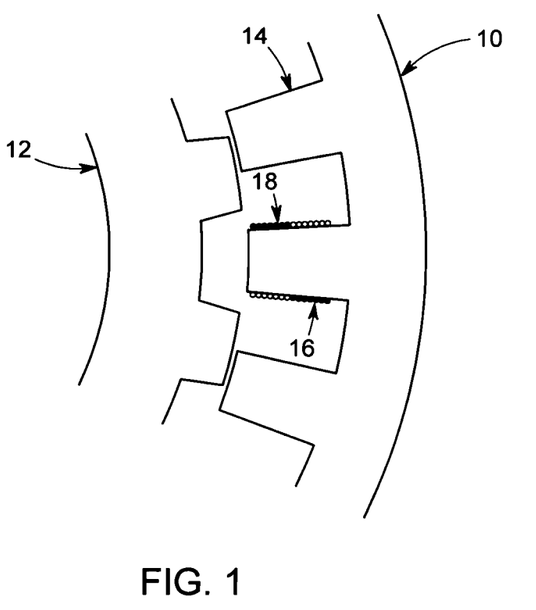
FIG. 1 is an axial view illustrating one portion of stator and rotor laminations for an electrical machine, according to one embodiment.

FIG. 1 is an axial view illustrating one portion of stator and rotor laminations 10, 12 for an electrical machine, according to one embodiment. The stator laminations 10 comprise a plurality of teeth 14. One or more short-pitch, concentrated windings are wound around each of the plurality of stator teeth 14. The short-pitch, concentrated windings may include an AC winding 16 and a DC winding 18, according to one embodiment. The term "short pitch, concentrated" as used herein means that each stator winding wraps around only one stator tooth 14. The rotor laminations 12 are devoid of windings or permanent magnets and the rotor is comprised of salient magnetic poles. The number of salient poles on the stator and rotor will necessarily be different to support torque production at all rotor positions. The stator and rotor poles are symmetrically displaced in space. The AC winding 16 on each stator tooth is associated with a particular phase winding. The magnetic polarity of the AC windings and DC windings is set by the number of stator teeth 14 and the number of rotor teeth.

An electrical machine may have both spatial nonlinearities and magnetic nonlinearities. Spatial nonlinearities means that the inductance of each stator coil is a function of rotor position, and the variation is nonlinear. Further, the magnetic steel that is used to form the stator and rotor laminations 10, 12 is able to saturate, and so the properties of the magnetic steels changes with corresponding changes in phase winding current. These two nonlinearities are coupled, since the degree of magnetic saturation is tied to the rotor position.

Although embodiments of a switched reluctance motor (SRM) are discussed and illustrated herein, aspects of the present invention are not limited to only SRMs and may be used with several different types of electrical machines (e.g., FSM, wound field synchronous). The methods discussed herein may be used with any synchronous machine having field windings, wherein the field windings are on the rotor or stator. The methods may, for example, also be used with a flux switching machine, a conventional synchronous machine with a wound rotor, and the like. In addition, the embodiments discussed and illustrated herein may be used in electrical machines that have phase windings that are distributed across multiple teeth, wherein the coils associated with each phase winding overlap one another and also the other phases. Further, the stator slot openings may be open as shown in FIG. 1; semi-closed where each tooth has a shoe that extends partially across the slot opening; or, fully-closed where adjacent teeth are bridged by ferromagnetic material.

Figure 2:
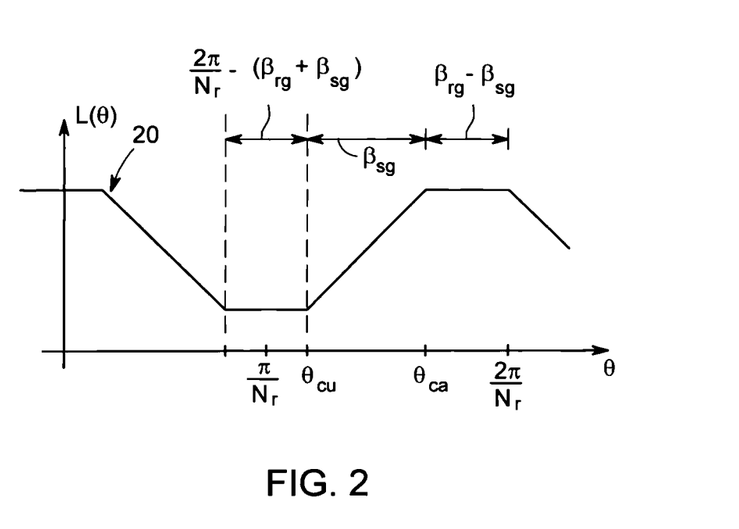
FIG. 2 is a graph illustrating an idealized inductance profile showing spatial nonlinearities for one stator winding of an electrical machine, according to one embodiment.

FIG. 2 is a graph 20 illustrating an idealized inductance profile showing spatial nonlinearities for one stator winding of an electrical machine, according to one embodiment. The inductance $L(\theta)$ can be seen to vary from a maximum value to a minimum value and results in a trapezoidal waveform. The periodicity of the inductance is set by the number of rotor teeth.

Figure 3:
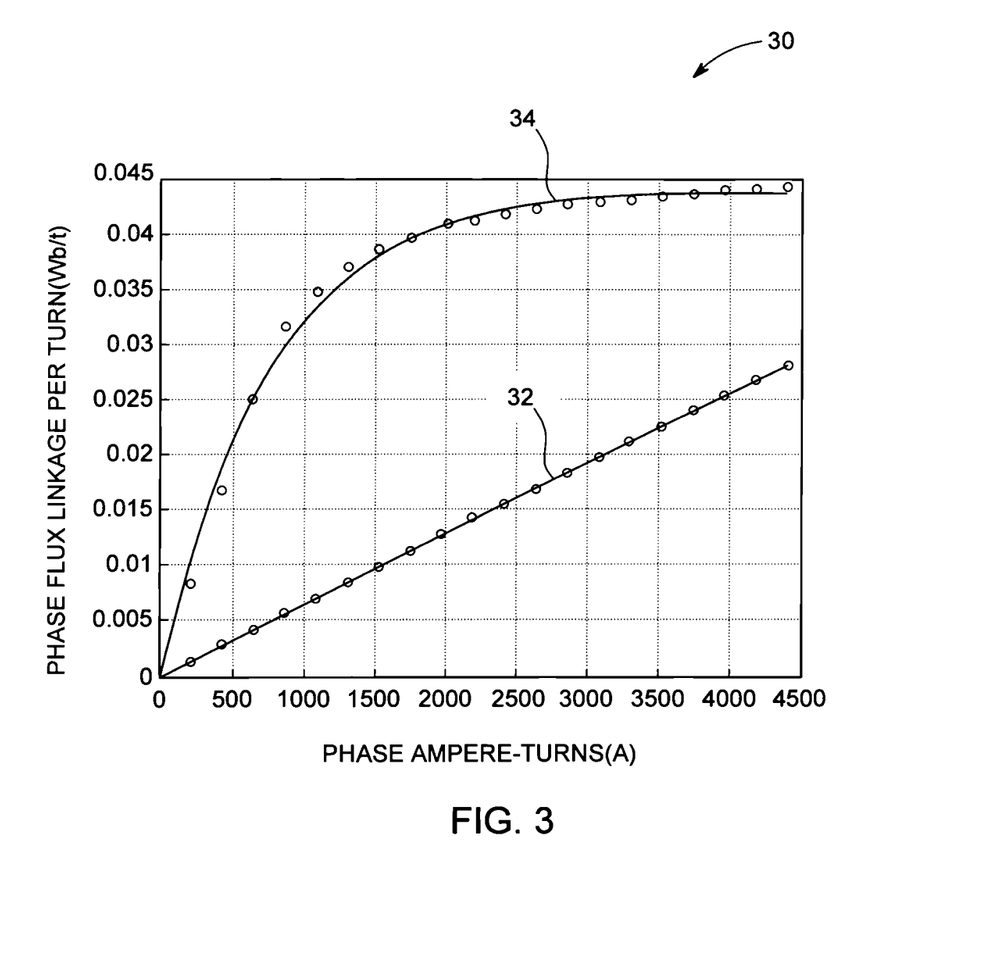
FIG. 3 is a graph illustrating magnetic nonlinearities due to saturating steel associated with an electrical machine, according to one embodiment.

FIG. 3 is a graph 30 illustrating magnetic nonlinearities due to saturating steel associated with an electrical machine, according to one embodiment. The bottom line 32 represents the phase flux linkage as a function of current when the rotor is in the minimum inductance position. The upper curved line 34 represents the phase flux linkage as a function of current when the rotor is in the maximum inductance position. It will be appreciated that the combination of spatial and magnetic nonlinearities makes torque production a function of rotor position and the currents in each phase winding.

Figure 4:
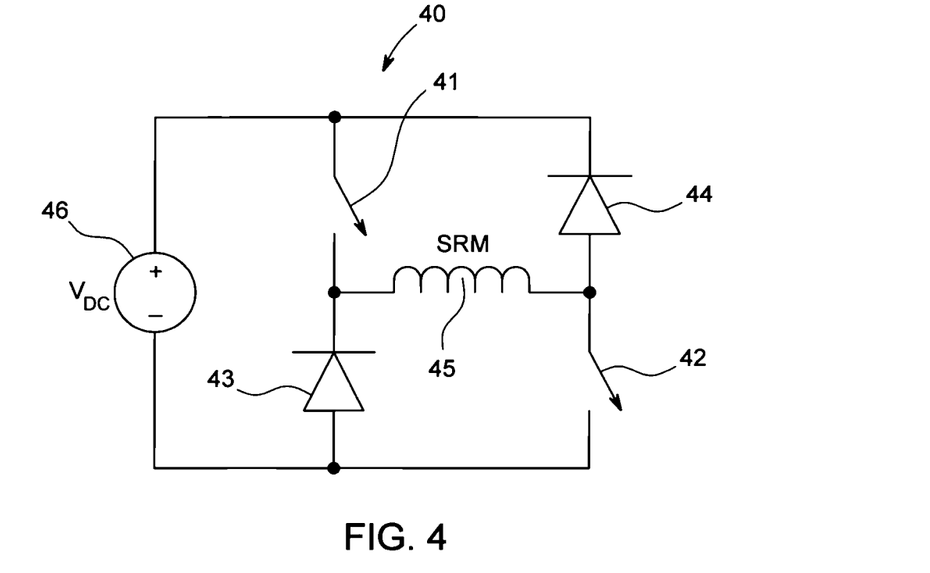
FIG. 4 is a simplified schematic illustrating a typical inverter structure associated with one phase of an electrical machine.

FIG. 4 is a simplified schematic illustrating a typical inverter structure 40 associated with one phase of an electrical machine. The inverter 40 comprises a pair of controllable switches 41, 42 and a pair of diodes 43, 44 connected to one phase 45 of an electrical machine. A three phase switched reluctance motor, for example, will comprise three such inverters 40 connected together in parallel. When both switches 41, 42 are closed, current is driven into the phase winding 45. One of the switches 41, 42 is operated in a pulsed mode, opening and closing the switch, in order to regulate the phase current. Passing current out of the phase winding 45 is accomplished by opening both switches 41, 42 which then allows stored phase energy to force both diodes to transition into their respective conduction modes, allowing the phase current to flow back to the power source 46.

Figure 5:
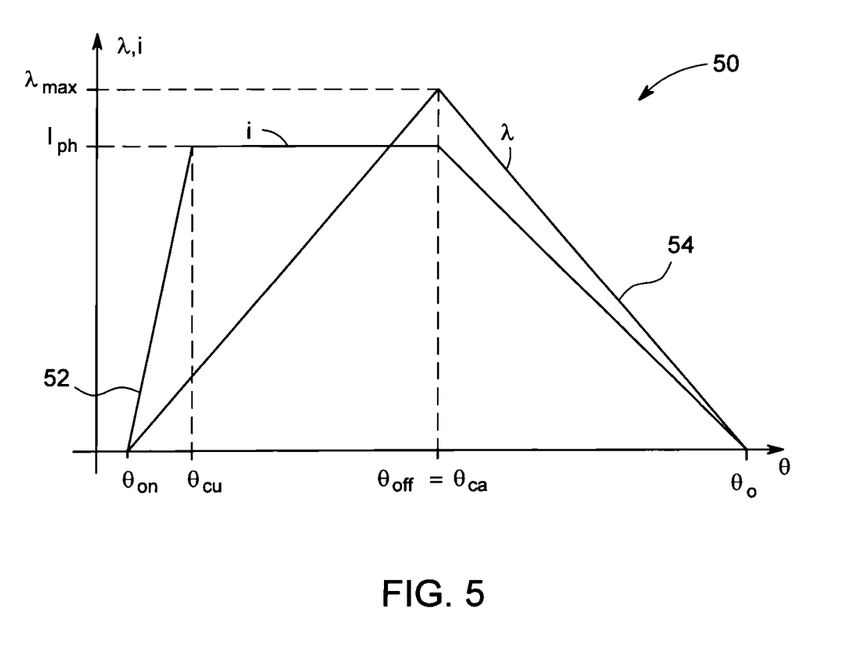
FIG. 5 is a graph illustrating idealized phase current and flux linkages of an electrical machine controlled through switching action of the inverter shown in FIG. 4 while operating at base speed, according to one embodiment.

FIG. 5 is a graph 50 illustrating one phase current 52 of an electrical machine controlled through switching action of the inverter 40 shown in FIG. 4, according to one embodiment. The phase current i builds up following closure of the controllable switches 41, 42, and reaches a constant level $I_{ph}$ that is maintained by operation of the motor at base speed where the phase currents are self-regulated. It will be appreciated that a current waveform of similar shape can be created in response to the aforementioned pulsing operation of one of the controllable switches 41, 42. When both controllable switches 41, 42 are opened, the phase current i drops off as quickly as possible. The slope between $\theta_{on}$ and $\theta_{cu}$ can be seen to be smaller than the slope between $\theta_{off}$ and $\theta_o$. This is because $\theta_{on}$ is near the minimum inductance position and current rises faster with a smaller inductance; wherein $\theta_o$ is in a position where the inductance is larger which causes the current transition period to increase. The foregoing operating principles can be seen to cause the phase flux linkage 54 to rise and fall in a substantially linear manner for operation at base speed. It will be appreciated that even though the phase current is controlled to be nominally constant, the torque produced by the excited phase will not be constant because of the aforementioned spatial and magnetic nonlinearities. The variation in torque production with position, in conjunction with moving the responsibility for torque production from one phase to another, creates both average torque and torque ripple. Torque ripple is a known attribute of some electrical machines.

Electrical machine phase currents are typically thus controlled by three parameters including turn-on angle, turn-off angle, and nominal phase current. At high speeds, the phase currents are self-regulated by the limited voltage. At low speeds, the phase currents are regulated through switching action of the inverter 40. It will be appreciated that adding additional degrees of freedom to the phase current profile will allow greater control over the torque produced by each phase, thereby offering the possibility of controlling torque ripple as torque production is passed from one phase to another phase. More sophisticated current regulation methods are still limited to low speeds where the inverter has the ability to shape the phase currents.

With continued reference to FIG. 5, it can be observed that a repeating phase current 52 produces an average component and an alternating component. Thus, one option for changing the excitation of the electrical machine windings comprises splitting each phase winding into two pieces. A nominally constant current may then be applied to one of the pieces, while an alternating current may be applied to the remaining piece.

Figure 6:
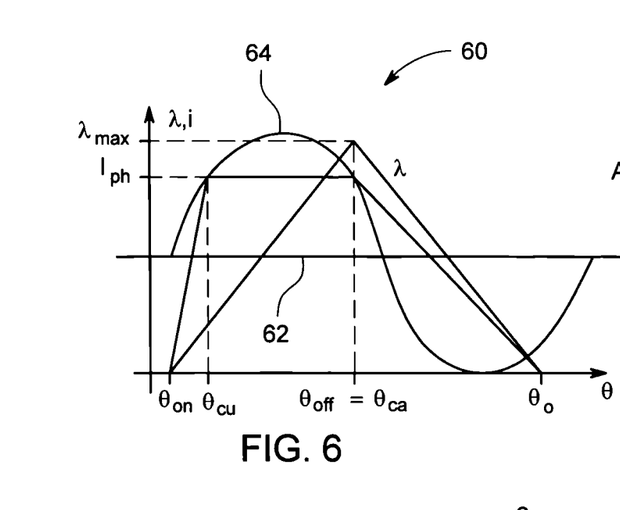
FIG. 6 is a graph illustrating excitation of an electrical machine by decomposing each phase current into the superposition of a DC current with an AC current waveform, according to one embodiment.

FIG. 6 is a graph 60 illustrating excitation of an electrical machine by decomposing each phase current into the superposition of a DC current 62 with an AC current waveform 64, according to one embodiment.

Figure 7:
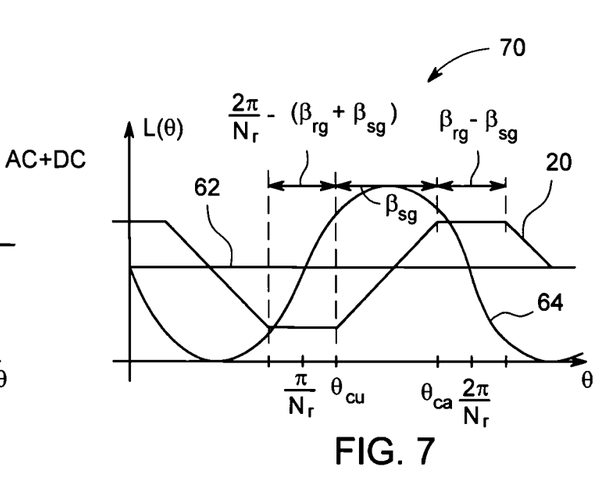
FIG. 7 is a graph illustrating the AC current waveform and the DC current shown in FIG. 6 aligned with an electrical machine inductance profile to preferentially produce torque, according to one embodiment.

FIG. 7 is a graph 70 showing the AC component 64 and the DC component 62 aligned with the inductance profile to preferentially produce positive torque. The AC component 64 may be produced by an inverter 40 such as shown in FIG. 4, (with the diodes replaced by controllable switches similar to controllable switches 41, 42), while a separate DC current generator circuit (not shown) may be employed to produce the DC component 62. Electrical machine torque ripple reduction may also be achieved, for example, by changing the electrical machine magnetic circuit or by changing the magnetic circuit in combination with the torque ripple reduction principles described herein. It will be appreciated that if the AC component of the currents sourced to the electrical machine phase windings are symmetrically displaced in time, it is no longer necessary to use the inverter topology of FIG. 4. Instead, a conventional inverter topology using two controllable switches per phase can be used, where the AC windings are connected in a Y or Δ configuration as in conventional AC machines, e.g., an induction motor.

Figure 8:
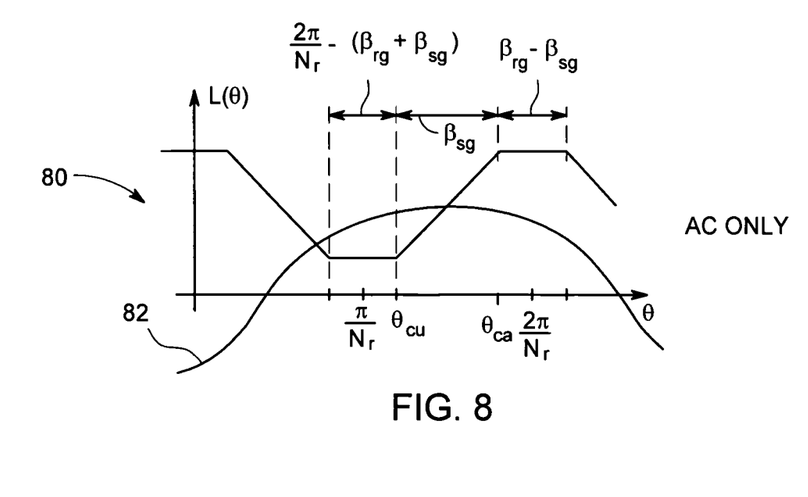
FIG. 8 is a graph illustrating excitation of an electrical machine by changing each phase current to an AC waveform, allowing use of a conventional three-phase inverter topology, according to one embodiment.

FIG. 8 is a graph 80 illustrating excitation of an electrical machine by changing each phase current to an AC waveform 82, allowing use of a conventional inverter topology that only has two controllable switches per phase, according to another embodiment. It should be noted that decomposing each phase current into the superposition of a DC component 62 with an AC component advantageously allows a greater ability to produce the desired torque over a wider speed range than that achievable when simply changing each phase current to an AC waveform 82. Simply changing each phase current to an AC waveform 82 advantageously allows use of conventional inverter topologies, as stated herein, without the need for exciting a DC winding.

Figure 9:
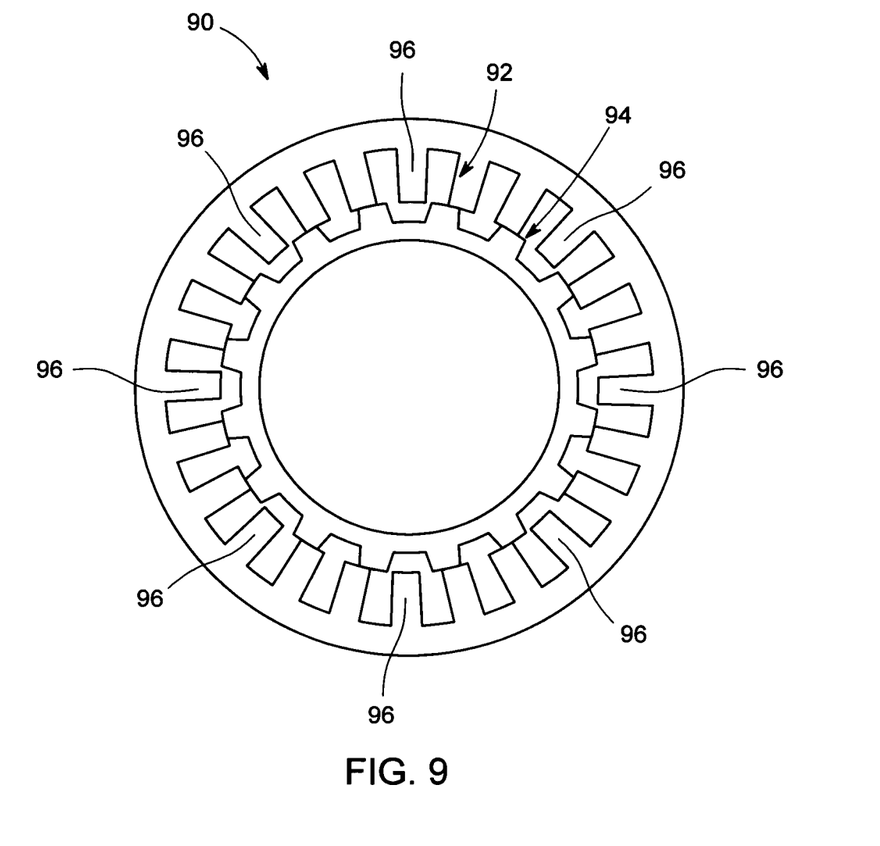
FIG. 9 shows a typical lamination set for an electrical machine suitable for use in association with the torque ripple control principles described herein.

FIG. 9 shows a typical lamination set 90 for an electrical machine suitable for use in association with the torque ripple control principles described herein. The lamination set 90 comprises 24 stator poles 92 and 18 rotor poles 94. The 24 stator poles 92 are split into three phases comprising eight stator poles 92 per phase winding. Thus, the rotor poles 94 and the stator poles 92 can be seen to have the same positions relative to one another at each third stator pole 92. The phase structure can be seen by looking at how the stator poles 92 align with the rotor poles 94. The stator poles 96 that are located at N., S., E., W., NE., SE., SW. and NW., for example, are all centered between two rotor poles 94. Accordingly, these poles are associated with the same phase. The remaining phases can be determined by application of the same principles to the other phase structures.

Figure 10:
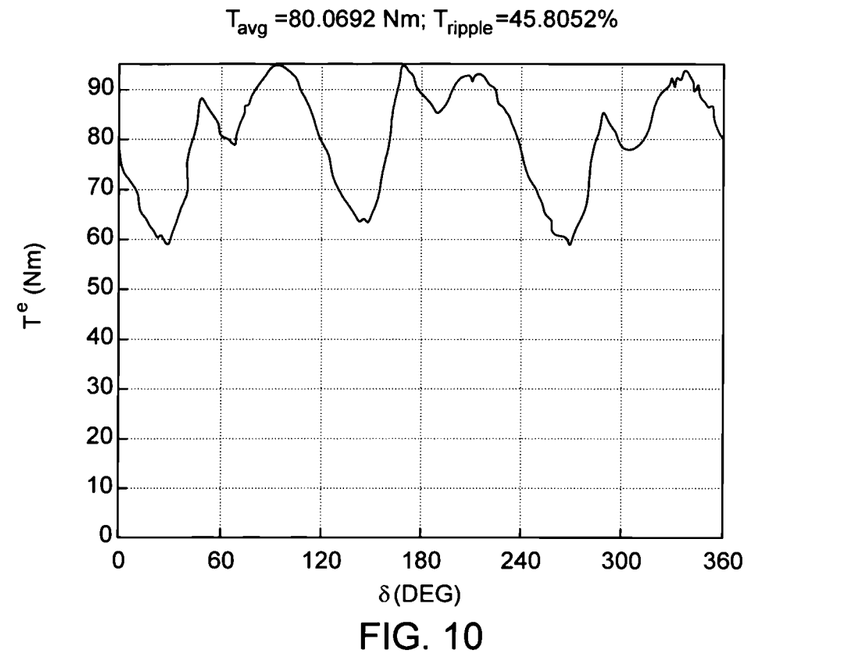
FIG. 10 is a graph illustrating electromagnetic torque production using a constant field current in an electrical machine, according to one embodiment.

FIG. 10 is a graph illustrating electromagnetic torque production by an electrical machine when using a constant field current in the electrical machine, according to one embodiment. The AC phase currents are sinusoidal and symmetrically displaced in time. The variation in torque as a function of rotor position is evident; this torque variation is the torque ripple.

Figure 11:
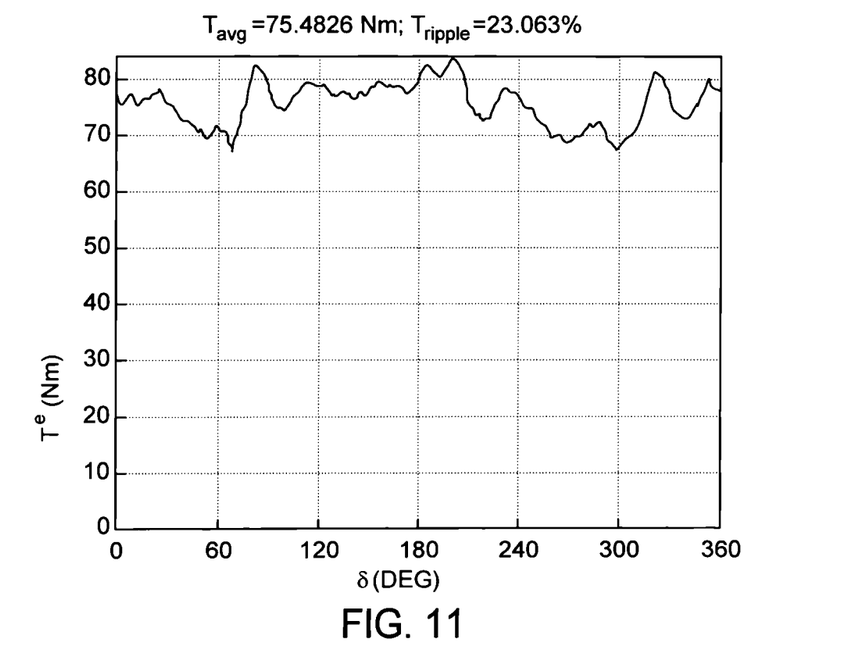
FIG. 11 is a graph illustrating electromagnetic torque production using a spatially varying field current in an electrical machine, according to one embodiment.

FIG. 11 is a graph illustrating electromagnetic torque production by an electrical machine when using a spatially varying field current in the electrical machine, according to one embodiment. The present inventor recognized that since an electrical machine three phase winding may utilize simple sinusoidal currents, the torque ripple may then be controlled for all phases of the electrical machine by controlling a single current. The magnetic structure of the electrical machine, for example, may be analyzed to determine how the single controlled current should vary with position in order to minimize torque ripple. According to one embodiment, the controlling current is a DC winding current $i_o$ represented in Eq. 1 as $$i_o = \sqrt{3} I f(\delta) \quad \text{Eq. 1}$$

Where $$f(\delta) = 1 + k_3[\sin(3\delta+\gamma) + \tan(\gamma)\cos(3\delta+\gamma)] + k_6[\sin(6\delta+\gamma) + \tan(\gamma)\cos(6\delta+\gamma)] \quad \text{Eq. 2}$$

and where δ is angular degrees (position), $k_3$ and $k_6$ are constants, and γ is a phase angle.

In summary explanation, a method of reducing torque ripple in an electrical machine comprises splitting each phase winding of the electrical machine into an AC winding and a DC winding such that the AC windings may employ a conventional inverter topology, while the DC windings provide a lever to control the torque produced by the electrical machine. The AC windings are excited with sinusoidal currents, allowing the phase currents to be projected into a reference frame that moves synchronously with the electrical machine rotor, and an average torque component and a ripple torque component are calculated therefrom. The DC windings associated with each phase winding are excited with a spatially varying current based on the ripple torque component.

Reference frame, as used herein, is a basis of orientation for construction of the currents that excite the electrical machine. Using a stationary reference frame suggests, for example, the use of sinusoidal currents that create a rotating magnetic field. A rotating reference frame that is attached to the field that moves through the air gap of the motor suggests using currents that are constant relative to this reference frame. This reference frame that rotates with the air gap field is frequently referred to as the "d-q" reference frame. It is used to examine the control of AC machines from the same perspective as DC machines.

While the foregoing discussion has used the SRM as a vehicle for illustrating the concepts of separating the machine excitation current into a DC component and an AC component, wherein the addition of a small time-varying component of current is added to the DC component is used to reduce torque ripple, it will be appreciated that this same approach can be applied to other synchronous machines that have a field winding. Specific examples of such machines include, but are not limited to, the flux switching machine (FSM) and the conventional wound-rotor synchronous machine.

The FSM is a synchronous machine in which the field (DC) and armature (AC) windings are both housed on the stator. A doubly-salient magnetic structure is used to modulate the field flux seen by the armature windings, thereby creating a mechanism for creating electromagnetic torque through the interaction of the field flux with the armature magnetic field.

By virtue of the space harmonics associated with the doubly salient structure, it will be appreciated that a certain amount of torque ripple will be created by the interaction of the field and armature space harmonics. While the magnitude of the torque ripple can be controlled to some extent through careful magnetic design, it is impossible to eliminate torque ripple under all speed and loading conditions.

As with the case of the SRM illustrated above, adding a small time-varying component to the field current can be used to compensate for the space harmonics, thereby reducing the torque ripple from what it would be without such compensation.

As a further example, a conventional synchronous machine employs a field winding on the rotor and a three-phase distributed armature winding on the stator. The field winding is excited with DC that is either generated on the rotor using an exciter, or fed to the rotor through slip rings. The armature winding is excited with balanced three-phase AC currents. While a distributed armature winding can do an excellent job of producing a nearly sinusoidal magnetic field in the air gap of the machine, magnetic saturation, slotting, and other realities of installing the windings leads to some space harmonic fields within the air gap of the machine. Similar reasoning applies to the air gap magnetic field created by the rotor winding.

Collectively, the interaction of the space harmonics within the stator and rotor magnetic fields leads to torque ripple. This torque ripple can be reduced by adding a time-varying component to the DC field current. If the torque ripple is acceptably low, employment of this torque reduction technique could be used to simplify the field and/or armature windings. This would lead to an electrical machine that is less expensive to manufacture while offering acceptable performance.

While the invention has been described in terms of various specific embodiments, those skilled in the art will recognize that the invention can be practiced with modification within the spirit and scope of the claims.

The invention claimed is:

1. A method of controlling torque ripple in an electrical machine, the method comprising:
splitting each phase winding of an electrical machine into an AC winding and a DC winding;
exciting the AC winding of each phase winding with symmetrically displaced sinusoidal currents;
exciting the DC winding of all phase windings with a varying DC current based on spatially varying magnetic properties of the electrical machine; and
calculating the spatially varying magnetic properties of the electrical machine, wherein the spatially varying magnetic properties of the electrical machine are represented as $$f(\delta)=1+k_3[\sin(3\delta+\gamma)+\tan(\gamma)\cos(3\delta+\gamma)]+k_6[\sin(6\delta+\gamma)+\tan(\gamma)\cos(6\delta+\gamma)],$$

wherein $\delta$ is angular degrees (position), $k_3$ and $k_6$ are constants, and $\gamma$ is a phase angle.

2. The method of controlling torque ripple in an electrical machine according to claim 1, wherein the varying DC current is represented as $i_o=\sqrt{3}If(\delta)$, wherein I is a nominal DC current.

3. The method of controlling torque ripple in an electrical machine according to claim 1, wherein exciting the AC winding of each phase winding with sinusoidal currents comprises projecting the phase currents into a reference frame that moves synchronously with the electrical machine rotor.

4. The method of controlling torque ripple in an electrical machine according to claim 3, further comprising calculating the spatially varying magnetic properties of the electrical machine, wherein the spatially varying magnetic properties of the electrical machine are represented as $$f(\delta)=1+k_3[\sin(3\delta+\gamma)+\tan(\gamma)\cos(3\delta+\gamma)]+k_6[\sin(6\delta+\gamma)+\tan(\gamma)\cos(6\delta+\gamma)],$$

wherein $\delta$ is angular degrees (position), $k_3$ and $k_6$ are constants, and $\gamma$ is a phase angle.

5. The method of controlling torque ripple in an electrical machine according to claim 4, wherein the varying DC current is represented as $i_o=\sqrt{3}If(\delta)$, wherein I is a nominal DC current.

6. The method of controlling torque ripple in an electrical machine according to claim 1, wherein the electrical machine comprises a synchronous machine having a field winding.

7. The method of controlling torque ripple in an electrical machine according to claim 6, wherien the sychronous machine having a field winding comprises one of: switched reluctance machine (SRM), a flux switching machine (FSM), and a conventional sychronous machine having a wound rotor.

8. A method of controlling torque ripple in an electrical machine, wherein the electrical machine includes a field winding for creating nominally constant field current using DC current and an armature winding for creating a rotating magnetic field using AC current, the method comprising:
superimposing a spatially varying current component on to the DC current of the field winding, thereby reducing torque ripple in the electrical machine, wherein the spatially varying component is prescribed by an equation.

9. The method of controlling torque ripple in an electrical machine according to claim 8, wherein the spatially varying component is determined by a real-time controller.

10. The method of controlling torque ripple in an electrical machine according to claim 8, wherein the spatially varying component is determined adaptively.

11. The method of controlling torque ripple in an electrical machine according to claim 8, wherein the equation is as represented as $$f(\delta)=1+k_3[\sin(3\delta+\gamma)+\tan(\gamma)\cos(3\delta+\gamma)]+k_6[\sin(6\delta+\gamma)+\tan(\gamma)\cos(6\delta+\gamma)],$$

wherein $\delta$ is angular degrees (position), $k_3$ and $k_6$ are constants, and $\gamma$ is a phase angle.

12. The method of controlling torque ripple in an electrical machine according to claim 11, further comprising exciting the DC winding of each phase winding with a varying DC current, wherein the varying DC current is represented as as $i_o=\sqrt{3}If(\delta)$, wherein I is a nominal DC current.

13. The method of controlling torque ripple in an electrical machine according to claim 11, wherein at least one of constants, $k_3$ and $k_6$, are determined by a real-time controller.

14. The method of controlling torque ripple in an electrical machine according to claim 8, wherein the electrical machine comprises a synchronous machine having a field winding.

15. The method of controlling torque ripple in an electrical machine according to claim 14, wherien the sychronous machine having a field winding comprises one of: switched reluctance machine (SRM), a flux switching machine (FSM), and a conventional sychronous machine having a wound rotor.

16. A method of controlling torque ripple in an electrical machine, the method comprising:
splitting each phase winding of an electrical machine into an AC winding and a DC winding;
exciting the DC winding of all phase windings with a varying DC current based on spatially varying magnetic properties of the electrical machine;
exciting the AC winding of each phase winding with symmetrically displaced sinusoidal currents that vary in response to a rotor position; and calculating the spatially varying magnetic properties of the electrical machine, wherein the spatially varying magnetic properties of the electrical machine are represented as $$f(\delta)=1+k_3[\sin(3\delta+\gamma)+\tan(\gamma)\cos(3\delta+\gamma)]+k_6[\sin(6\delta+\gamma)+\tan(\gamma)\cos(6\delta+\gamma)],$$

wherein $\delta$ is angular degrees (position), $k_3$ and $k_6$ are constants, and $\gamma$ is a phase angle.

17. The method of controlling torque ripple in an electrical machine according to claim 16, wherein the varying DC current is represented as $i_o=\sqrt{3}If(\delta)$, wherein I is a nominal DC current.

18. The method of controlling torque ripple in an electrical machine according to claim 16, wherein the electrical machine comprises a synchronous machine having a field winding.

19. The method of controlling torque ripple in an electrical machine according to claim 18, wherien the sychronous machine having a field winding comprises one of: switched reluctance machine (SRM), a flux switching machine (FSM), and a conventional sychronous machine having a wound rotor.

20. A method of controlling torque ripple in an electrical machine, the method comprising:

splitting each phase winding of an electrical machine into an AC winding and a DC winding;

exciting the AC winding of each phase winding with symmetrically displaced sinusoidal currents; and exciting the DC winding of all phase windings with a varying DC current based on spatially varying magnetic properties of the electrical machine, wherein exciting the AC winding of each phase winding with sinusoidal currents comprises projecting the phase currents into a reference frame that moves synchronously with the electrical machine rotor.

21. The method of controlling torque ripple in an electrical machine according to claim 20, further comprising calculating the spatially varying magnetic properties of the electrical machine, wherein the spatially varying magnetic properties of the electrical machine are represented as $$f(\delta)=1+k_3[\sin(3\delta+\gamma)+\tan(\gamma)\cos(3\delta+\gamma)]+k_6[\sin(6\delta+\gamma)+\tan(\gamma)\cos(6\delta+\gamma)],$$

wherein $\delta$ is angular degrees (position), $k_3$ and $k_6$ are constants, and $\gamma$ is a phase angle.

22. The method of controlling torque ripple in an electrical machine according to claim 21, wherein the varying DC current is represented as as $i_o=\sqrt{3}If(\delta)$, wherein I is a nominal DC current.

* * * * *